Figure 6:
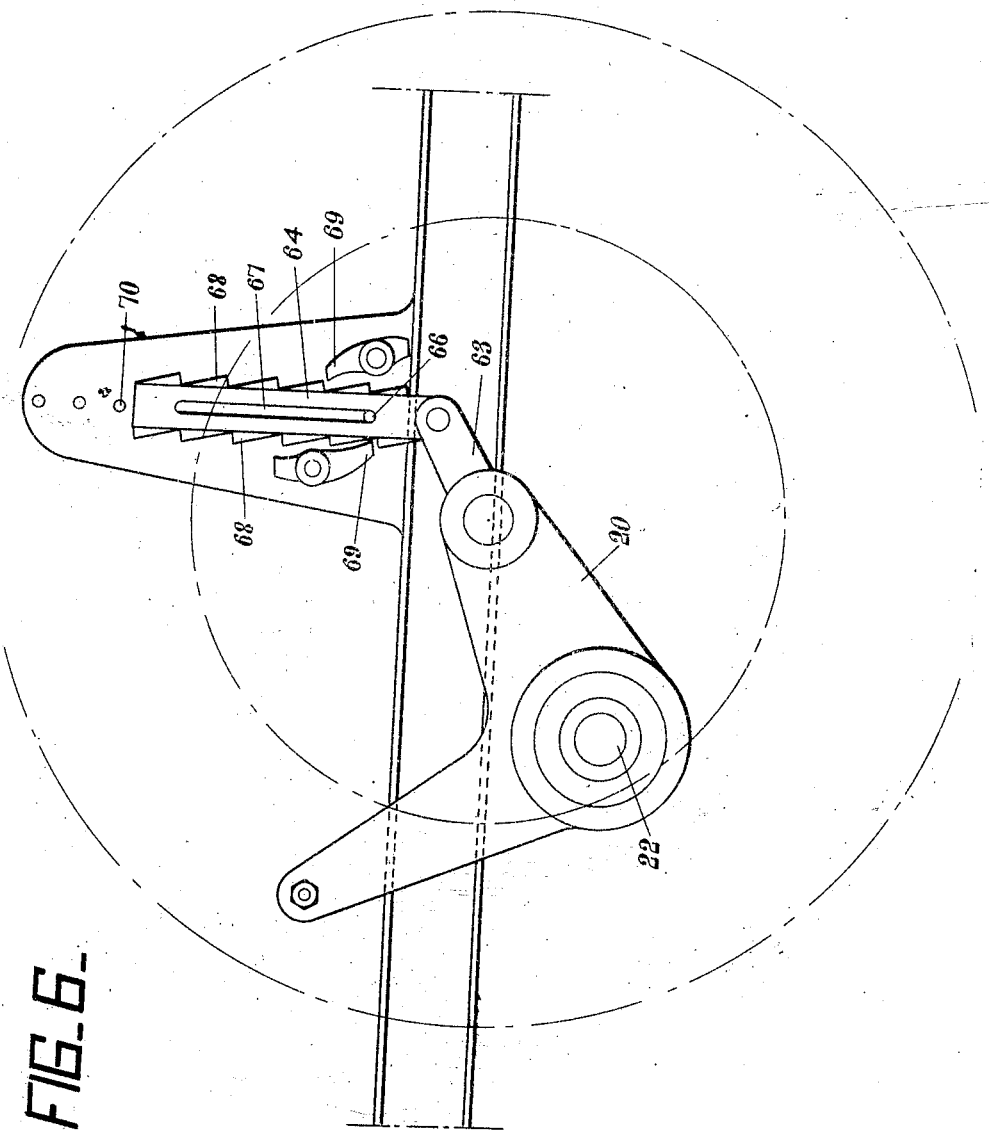

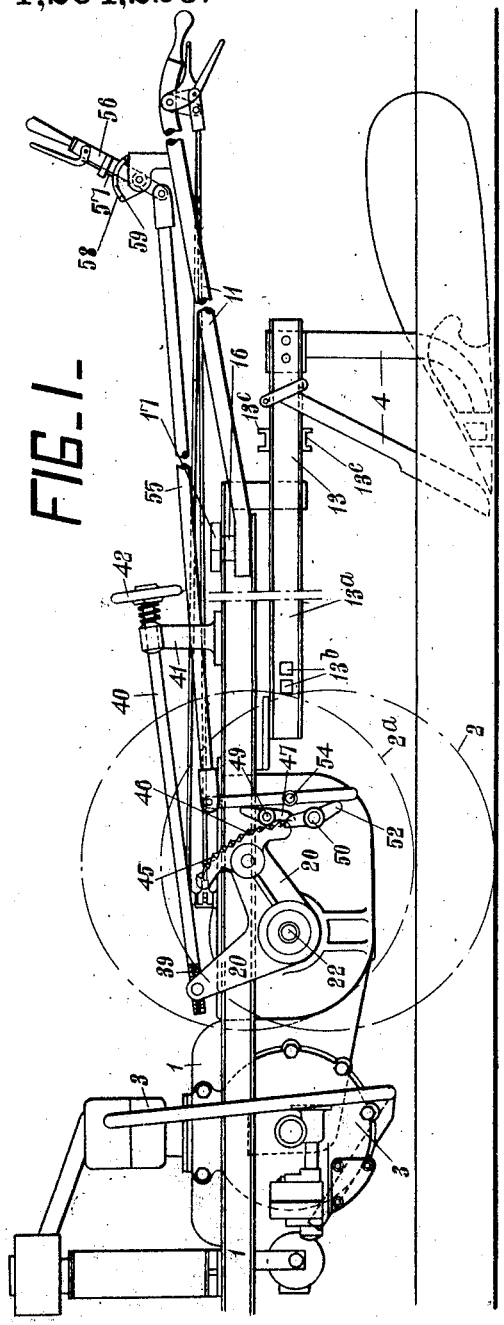

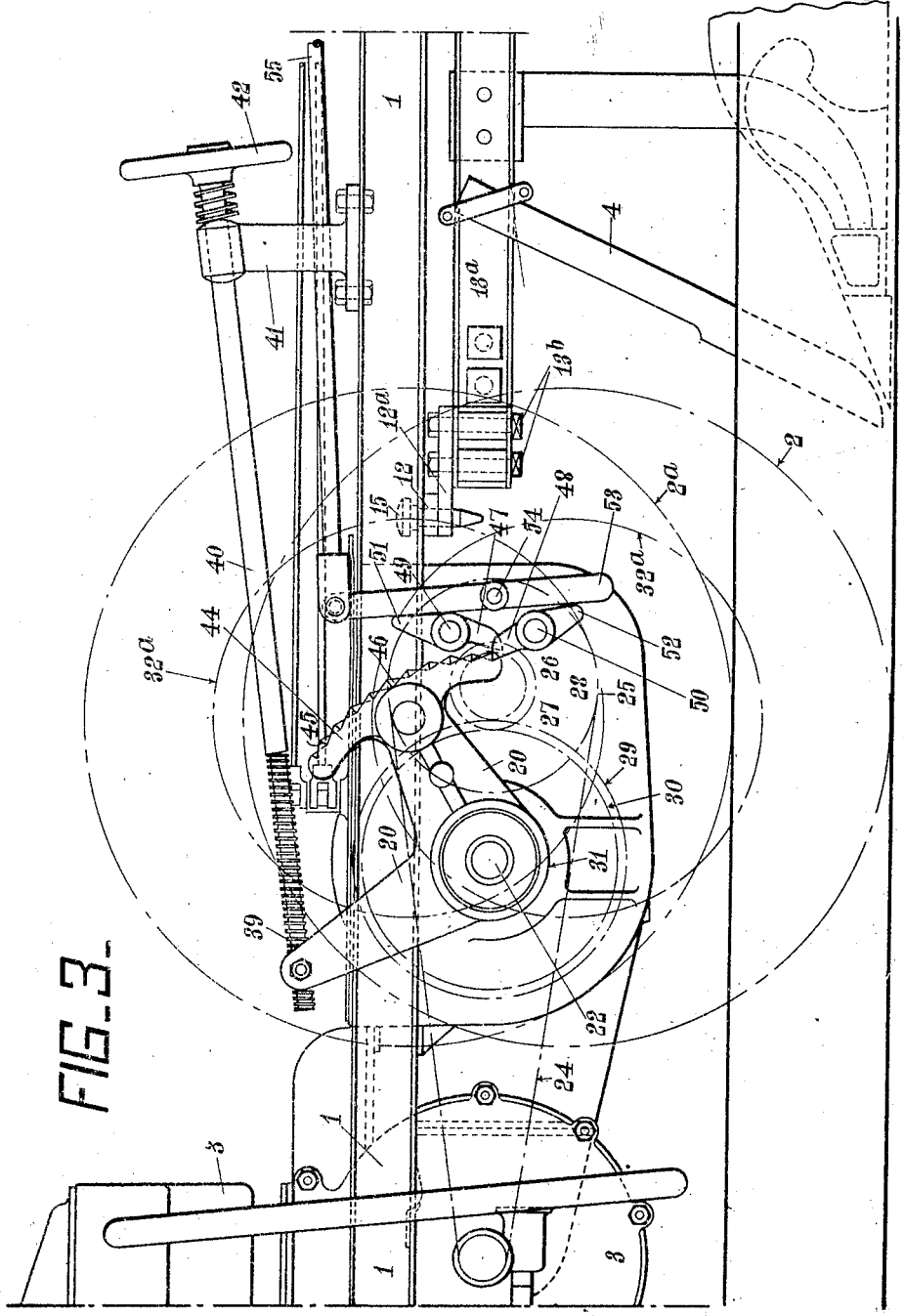

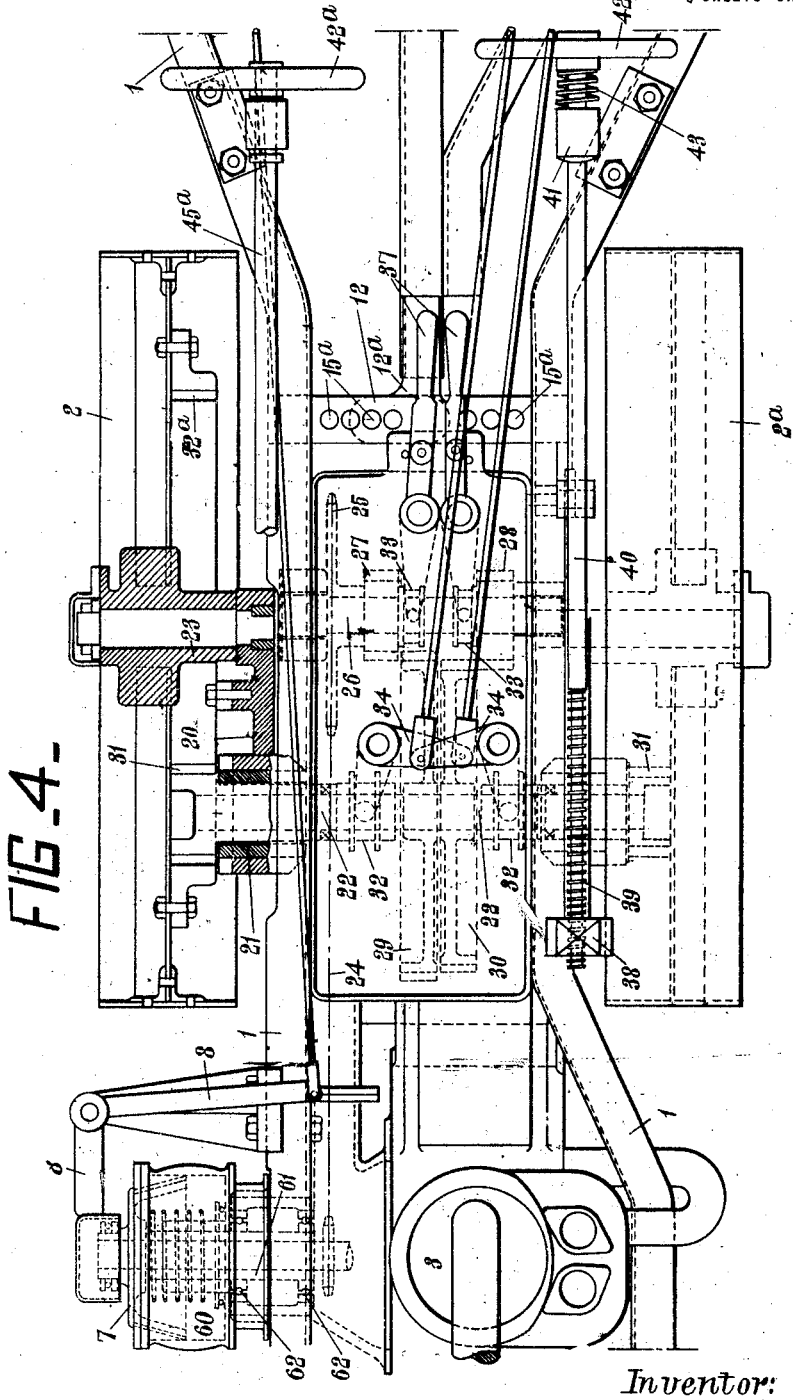

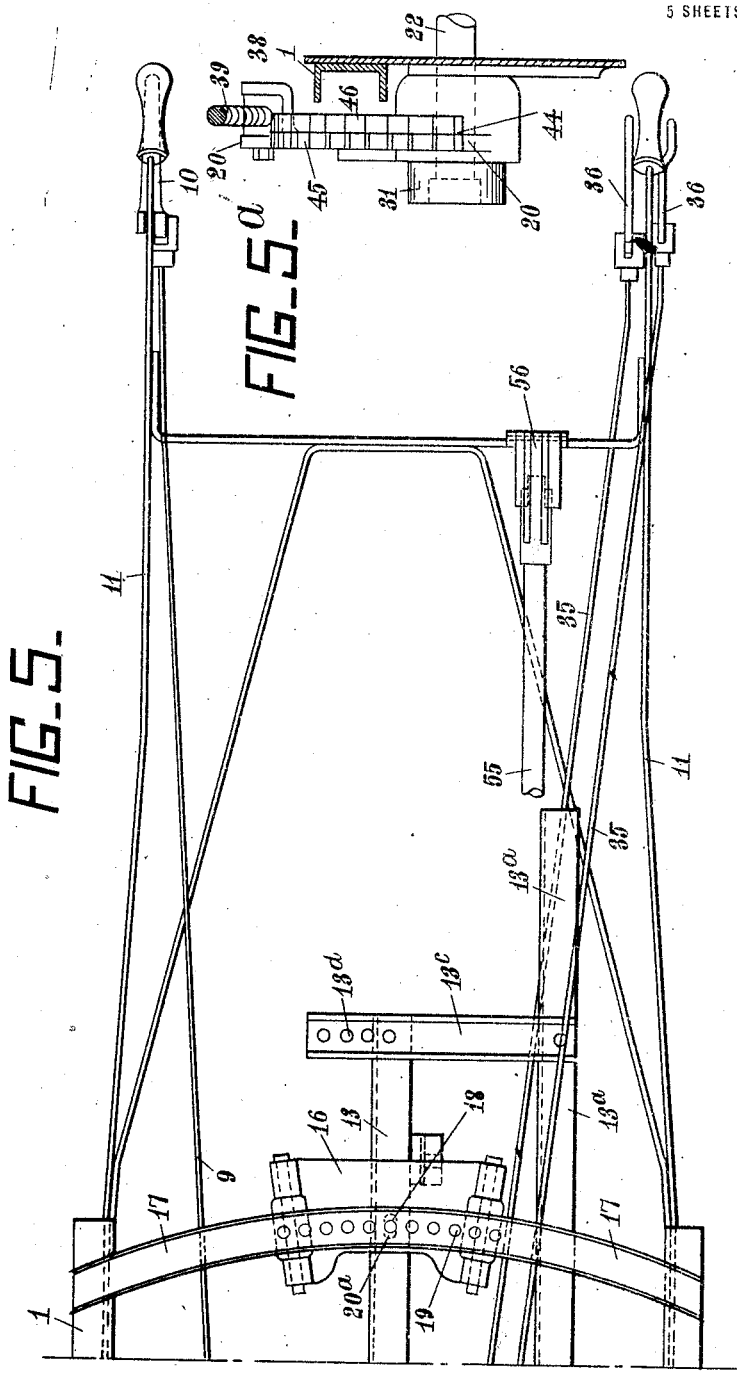

A. WYLES, Jr.
SELF PROPELLED AGRICULTURAL IMPLEMENT.
APPLICATION FILED JAN. 22, 1916.

1,204,226.

Patented Nov. 7, 1916.
5 SHEETS—SHEET 5.

Inventor:
Albert Wyles Junior
by his Attorney

UNITED STATES PATENT OFFICE.

ALBERT WYLES, JR., OF MANCHESTER, ENGLAND.

SELF-PROPELLED AGRICULTURAL IMPLEMENT.

1,204,226.  Specification of Letters Patent.  Patented Nov. 7, 1916.

Original application filed September 4, 1914, Serial No. 860,247. Divided and this application filed January 22, 1916. Serial No. 73,553.

*To all whom it may concern:*

Be it known that I, ALBERT WYLES, Jr., a subject of the King of England, residing at Manchester, in the county of Lancaster, in England, have invented certain new and useful Improvements in Self-Propelled Agricultural Implements, of which the following is a specification.

This invention relates to self-propelled agricultural implements, and comprises novel features and combinations of parts whereby many operations required in the art of cultivating may be carried out in a simple and efficient manner with a minimum of trouble on the part of operators and with low consumption of power.

This invention includes among other features a balanced construction permitting facilities of operation particularly in devious ways or courses, novel means whereby the implement may be steered by angular adjustment of the tilling implements, novel means whereby one or other of the running wheels may be raised or lowered in relation to the frame, and means whereby the frame may be raised by the motor power through the transmission mechanism to the running wheels for the purpose of carrying out certain evolutions in tilling operations.

A further object is to provide a two-wheeled machine adapted to successfully operate under conditions where the ordinary four-wheeled tractor would be impractical, with reference particularly to hill climbing powers, lightness of weight combined with durability, and ability to get a grip on the soils of different lands and under all conditions of working.

The present case forms a division of the subject matter disclosed in my co-pending application for U. S. Patent Serial No. 860,247 and dated Sept. 4, 1914.

The invention is hereinafter fully described and the novel features thereof specifically pointed out in the appended claims, reference being made to the accompanying drawings, in which—

Figure 1 is a side elevation, and Fig. 2 a sectional plan view of an implement having the present improvements applied thereto. Fig. 3 is an enlarged side elevation of parts shown in Fig. 1. Fig. 4 is an enlarged sectional plan view of parts shown in Fig. 2. Fig. 5 is a further enlarged plan view of other parts shown in Fig. 2. Fig. 5$^a$ is a detail view of a toothed segment hereinafter described. Fig. 6 is a detail view of a modification.

Referring to Figs. 1 to 5, 1 designates the main frame of the implement which is supported by two running wheels 2, 2$^a$ forward of which is disposed the motor 3 which is so located as to substantially balance the weight of the frame and implements 4 carried thereby rearward of the wheels. The said motor is suitably of the internal combustion kind of any conventional or appropriate type and includes a clutch 7 shown as operated by means of bell crank lever 8, rod 9 and hand lever 10 carried by one of the handles 11, two of which may be mounted at the rear of the frame 1 for controlling the implement by a man walking on the ground, although other means of control may be adopted.

Secured to the side members of the frame 1 is a transverse frame member 12, to which there is pivotally connected by means of a head 12$^a$ a strong beam or frame consisting of two members 13, 13$^a$ connected at their forward ends as by bolts 13$^b$ and at or adjacent their rear ends by two channel irons 13$^c$. The latter being provided with holes 13$^d$ for passage of a connecting pin (not shown) to permit of lateral adjustment of the two parts 13, 13$^a$ in which case the bolts 13$^b$ will be unscrewed and a filling piece inserted between the said two parts at this point. The beam thus constituted carries the tilling tool or tools 4 shown in the present example as plow shares secured to said beam in any conventional or approved manner. The head 12$^a$ and consequently the beam is mounted on said transverse member 12 by means of a vertical or substantially vertical pivot 15 which is adapted to engage one of a series of apertures 15$^a$ in the frame member 12, the pivot and consequently the beam being thus capable of lateral adjustment to vary the width of cut of the implement without altering the angle. Intermediate its ends the beam 13, 13ª is provided with an enlarged end or slide 16 and this slide moves between curved transverse guides 17. The beam 13, 13ª may thus be moved about its pivot 15 at any angle in relation to the plane of the running wheels 2, 2ª thus causing the tool or tools secured to said beam to coact with the ground when running in a furrow with the beam angularly adjusted to deflect the forward part of the implement including the running wheels and thus enable the implement to be steered.

A machine balanced upon two wheels without a third wheel would obviously be uncontrollable unless the plow, or other implement, was used to steer it. Also a machine balanced upon two driving wheels in which the plow was fixed rigidly in line with said wheels would not be capable of being steered in either direction. Thus in the present machine the plow is used in the capacity of a rudder, and the wheels may be guided in either direction without interference with the plow.

The slide 16 is shown as provided at its center with a slot 18 and the guides 17 are provided with a number of apertures 19 through one of which may be passed a pin 20ª which is caused to engage the slot and thus hold the beams 13, 13ª in place. The beam and tool or tools carried thereby may thus be secured at any angle within the range of the apertures 19, this method of securing the beam being adopted when not controlling the implement by hand, the implement then being capable of self-steering, attention only being required for turning at the end of a furrow.

The fact that the handles 11 are attached to the main frame 1 carrying the motor and provided with the running wheels and not to the tool supporting beam shows that the former is the part which receives the steering movements and not the tool. Steering can thus be effected without moving the tool in the ground.

One or both of the running wheels 2, 2ª of the implement is or are mounted for vertical adjustment relatively to the frame 1, the construction shown comprising a radial arm 20 of bell crank formation pivotally mounted on said frame by means of a boss 21 forming the bearing of a shaft 22, said arm having at its outer end a gudgeon 23 on which the wheel is mounted. The wheels are shown as driven from the motor 3 by mechanism comprising a chain 24 driving a sprocket wheel 25 on a counter shaft 26 on which is also mounted sliding pinions 27, 28 adapted to mesh with spur wheels 29, 30 carried by the shaft 22, this shaft being provided at each outer end with a driving pinion 31 which meshes with an internally toothed ring 32ª secured to the running wheel. It will thus be seen that the arm 20 is fulcrumed on the same axis as the driving pinion 31, thus enabling the wheel to be adjusted as to height in relation to the frame of the implement without affecting the driving transmission.

The shaft 22 is shown as provided with clutches 32 for giving a positive drive to both wheels and yet permitting either to overrun the other for steering purposes. Either of these clutches can be held out of gear by levers 34 and rods 35 carried to the rear of the implement and operable by hand levers 36. The sliding pinions 27, 28 are operated by means of levers 37 for controlling the speed through the gearing above described.

As aforesaid, the arm 20 is in the form of a bell crank and the arm thereof which does not carry the running wheel is provided with a nut 38 with which engages the screw threaded end 39 of a rod 40 which extends rearward and traverses a bracket 41 carried by the main frame 1, the rod being provided at its outer end with a hand wheel 42 between which and the bracket may be disposed a buffer spring 43.

The wheel carrying arm of the lever 20 is enlarged to form a segment 44 having the pivotal axis 22 as its center, this segment being provided with two sets of ratchet teeth 45 and 46 disposed side by side and oppositely directed and with each of said sets of ratchet teeth there is adapted to engage a pawl 47 or 48 respectively mounted on spindles 49 and 50 suitably supported and having tails 51 and 52. The pawls are controlled so that only one of the same can be in engagement with the ratchet teeth at once, the means shown for this purpose consisting of a lever 53 pivoted at 54 between the pawls and adapted to bear against the tails of said pawls, the lever being actuated by a rod 55 extending rearward and being under the control of the operator as by means of a hand lever 56 having a dog catch 57 engaging notches 58 in a quadrant 59, whereby the lever may be held in its positions of adjustment.

By the means described it will be seen that either of the levers 20 can be manually rotated about its pivot 22 to raise or lower either or both the wheels relatively to the frame and thus to each other or in other words lower or raise the frame in relation to the ground and by suitably positioning the hand wheels 42 the limit of such raising or lowering can be varied at will, but in the working of the implement if the lever 20 were left free the weight of the implement would cause the frame to fall and the wheels to occupy the upper position shown in Fig. 1, but the extent of movement of the wheels can be controlled by said hand wheel 42 and connections to said lever 20, and when the engine 3 is in operation the force exerted by the transmission mechanism will, through the driving pinion 31 and internal ring 32ª on each wheel, cause the frame to rise and consequently bring the wheels into the lower position shown in Fig. 1 and by manipulating the lever 53, the pawls 47 and 48 relating to the wheel in question will be actuated to permit or prevent these movements as required by the operator.

Owing to the vertical adjustment of the wheels, the plow, or other implement, can work at any desired depth between the minimum and the maximum; and with one wheel running in the furrow the machine is capable of developing its full tractive effort whatever the condition of the top soil. Also by running one wheel in the furrow and setting the plow at a slight angle with the motor, the furrow wheel may be made to hug the previous furrow, and the machine then becomes absolutely self-steering on a substantially straight furrow. In practical use the first furrow should be made with the wheels running on top of the ground; then one wheel should be adjusted to run in the furrow; then when the plow is set at the proper angle the machine can travel from one side of the field to the other without any manual steering whatsoever. These advantages are due to the presence of the wheel adjusting means and the employment of the plow as a rudder for steering.

In the example of a plow as shown, the land wheel 2ª is provided with all the above described means of adjustment. The furrow wheel 2 is in the lower position in the furrow and the land wheel is in its uppermost position, or raised, as far as the handwheel 42 and the parts controlled thereby will permit. The furrow wheel 2 is however provided with a spindle 40ª and handle wheel 42ª for manual adjustment only. At the end of the furrow it is necessary to bring said land wheel 2ª to the lower position to correspond more or less to the position of the furrow wheel 2 whereby the frame is lifted and the nose of the plow or plows removed from the ground. On reaching the end of the furrow the operator, by means of the lever 56, rod 55, and lever 53 disengages the pawl 48 from its ratchet teeth 45 and the engine power through the transmission mechanism as described raises the frame of the implement, whereupon the other pawl 47 will be engaged with its ratchet teeth 46 to hold the segment 40 and consequently the frame in this raised position. The nose of the plow is now clear of the ground and the headland can be negotiated. On entering the return furrow the last mentioned pawl 47 is disengaged and the engine being stopped (or one of the clutches 32 between the transmission and wheel disengaged) the frame of the implement falls by gravity on the desired depth of plowing determined by the degree of adjustment imparted by the hand wheel 42, shock being absorbed by the buffer spring 43. The land wheel 2ª thus returns to its raised position and the first mentioned pawl 48 is caused to reëngage its ratchet teeth 45 so that when the engine power is reapplied the parts are maintained in this position until said pawl is again released.

The principle above described of raising the implement frame by the engine power through the transmission mechanism is to the running wheel or wheels holds good whether an internal ring and pinion as described or an external gear wheel and pinion are used, provided that said pinion is located in front of the wheel axis. If said pinion were disposed behind the wheel axis the pressure exerted by the intermeshing gearing would be in the wrong direction and it would be necessary to reverse the motor in order to raise the frame. The tools may thus be lifted to the surface of the ground on reaching the end of a furrow without stopping the implement and then by driving one ground wheel only by manipulating one or other of the clutches 32 the implement can be swung around upon the other wheel as a pivot.

The machine is constructed to plow as wide as its total wheel width and can consequently complete plowing a field without the employment of horses to finish the last or outside furrows. The total length of the machine including the plow is relatively short and thereby its turning is facilitated and only a minimum of headland is left unplowed. These last mentioned features are of great moment to farmers generally and are due to the novel assembly and coöperation of balancing and self steering elements of the machine.

The aforesaid clutch 7 may be arranged within and carries a pulley 60 by means of a sleeve 61 carried by ball bearings 62, said pulley being adapted to drive as by a belt all forms of farm machinery, such as chaff cutters, sheep shearers, pumps, hay elevators and the like. Two important effects are obtained by this construction, viz., all stress set up in the pull on the belt is entirely removed from the engine bearings and the belt drive is operated through the clutch.

Fig. 6 shows a modification in which the radial arm 20 mounted on the shaft 22 is provided with a link 63 which is connected to a slidable rack 64 guided on a bracket 65 mounted on the frame by means of a pin 66 on the bracket passing through a slot 67 in the rack. The said rack is provided on opposite sides with ratchet teeth 68 of opposite direction with each of which there is adapted to engage a pawl 69 pivoted to the bracket. The extent of movement of the rack is limited by means of a pin or the like adapted to be inserted in one of a series of holes 70 in the bracket.

It will be obvious from the above description that the various features of the improved implement are all correlated or coöperate to produce successful plowing, for instance the fact that one wheel of the implement is capable of running in the furrow and the other on the land together with the angular adjustment of the beam carrying the plow shares and the means for maintaining same in the position given thereto permits of directing the vehicle as desired without positively steering the road wheels, and also of operating the implement without attendance except at the headlands, the raising of the frame at the headlands and the unclutching of one of the road wheels, permits the implement to be rapidly turned at the headland about the other wheel for commencing a fresh furrow; the substantial balancing of the tool carrying frame on the wheel axle renders the whole implement easily controlled in all operations by the operator, and the lateral adjustment of the pivotal point of the tool carrying beam allows the point of tractive effort on said beam to be altered to produce the best results according to the nature of the soil under cultivation.

The machine as a whole is light and efficient giving a considerably greater percentage of net tractive effort for its weight than a four wheeled machine; and its weight, as a whole, is so distributed as to locate the center of gravity upon the axes of the traction wheels, thereby insuring the maximum ground gripping effect, ease of manipulation, sharpness of turning; and, in consequence of these advantages the cost of operation is reduced.

The advantages which have been above enumerated are attributable to the combination and coöperation of the balanced frame supporting the plow and the motor, together with the swiveling of the plow to enable same to act as a rudder; and the combination and coöperation of the vertical and independent adjustments of the wheels together with the lateral adjustment of the plow.

It will be readily appreciated that however desirable the balanced construction is it would be impossible to dispense with a third wheel for steering unless the plow or implement was used as a rudder, but the introduction of a third wheel, to be used for steering, would necessitate placing a proper proportion of the weight put upon this wheel and in such case the machine would not be balanced.

In plowing there is actually a resistance in the line of draft, and also a lateral or side thrust due to the pressure of the soil against the mold board. This side thrust is well known and is a source of great trouble with ordinary wheeled plows. The mean line of draft lies in front of and on the furrow side of the plow, and this line should be coincident with the center line of the motor, which coincidence can be obtained only by having the wheels independently adjustable in height. This is essential since the motor tractor wheels, which run on the top of the ground, must always tend to travel a little to the left of the plow (assuming the plow to be turning the soil to the right), and there is consequently a heavy side load on the tractor which tends to reduce its efficiency; but these disadvantages are overcome or avoided in the present invention through the vertical and independent adjustment of the wheels and the lateral adjustment of the plow, such adjustments enabling the parts to be so arranged that the center line of draft of the motor will be on the offset line of draft of the plows.

What I claim as my invention and desire to secure by Letters Patent of the United States is:—

1. In a self-propelled agricultural machine the combination of a frame, a pair of side by side wheels supporting the frame, a motor mounted on the frame and connected to drive said wheels, an earth working implement carried by the frame, means for changing the plane of elevation of the frame, and means for varying the angle of the implement with respect to the frame, the whole constituting a unitary structure supported and balanced solely on the axis of the tractor wheels.

2. In a self-propelled agricultural machine the combination of a frame, a pair of side by side wheels supporting the frame, a motor mounted on the frame and connected to drive said wheels, an earth working implement carried by the frame and providing a rudder for the machine while traveling, means for changing the plane of elevation of the frame, and means for varying the terrain angle of the implement with respect to the frame, the whole constituting a unitary structure supported and balanced solely on the axis of the tractor wheels.

3. A self-contained motor driven agricultural implement comprising a frame, a pair of side by side wheels supporting said frame and adjustable relatively thereto, an earth working implement carried by said frame in rear of the wheels, and a motor carried by said frame in front of the wheels, the whole constituting a unitary structure supported and balanced solely on the axis of the tractor wheels.

4. A self-contained motor driven agricultural implement comprising a frame, a pair of side by side wheels supporting said frame and adjustable relatively thereto, an implement carrying member connected with the frame and capable of lateral adjustment relatively thereto, a tool carried by said member in rear of the wheels, and a motor carried by said frame in front of the wheels, the whole constituting a unitary structure supported and balanced solely on the axis of the tractor wheels.

5. A self-contained motor driven agricultural implement comprising a frame, a pair of side by side wheels supporting said frame, means for vertically adjusting a wheel, a tool carried by said frame in rear of the wheels, and a motor carried by said frame in front of the wheels, the whole constituting a unitary structure supported and balanced solely on the axis of the tractor wheels, substantially as described.

6. A self-contained motor driven agricultural implement comprising a frame having steering handles at its rear operable by a person walking on the ground; a pair of wheels supporting said frame and mounted to have independent vertical adjustment, a tool carried by said frame in rear of the wheels, and a motor carried by said frame in front of the wheels, the whole constituting a unitary structure supported and balanced solely on the axis of the tractor wheels, substantially as described.

7. A self-contained motor driven agricultural implement comprising a frame having steering handles at its rear operable by a person walking on the ground; a pair of wheels supporting said frame, means for vertically adjusting a wheel, an implement carrying member connected with the frame and capable of lateral adjustment relatively thereto, a tool carried by said member in rear of the wheels, and a motor carried by said frame in front of the wheels; the whole constituting a unitary structure supported and balanced solely on the axis of the tractor wheels, substantially as described.

8. A self-contained motor driven agricultural implement comprising a frame, a pair of side by side wheels supporting said frame, means for vertically adjusting a wheel, a tool carrying member connected with the frame and capable of lateral adjustment relatively thereto, a tool carried by said member in rear of the wheels, and a motor carried by said frame in front of the wheels; the whole constituting a unitary structure supported and balanced solely on the axis of the tractor wheels, substantially as described.

9. A self-contained motor driven agricultural implement comprising a frame having steering handles at its rear operable by a person walking on the ground; a pair of wheels supporting said frame and mounted to have independent vertical adjustment, a tool carrying member connected with the frame and capable of lateral adjustment relatively thereto, a tool carried by said member in rear of the wheels, and a motor carried by said frame in front of the wheels; the whole constituting a unitary structure supported and balanced solely on the axis of the tractor wheels, substantially as described.

10. In a self-propelled agricultural machine, the combination of a frame, a pair of tractor wheels supporting same, means for vertically adjusting a wheel, a motor mounted on the frame and connected to drive the wheels, an implement carrying member mounted to have lateral adjustment on the frame, and an implement mounted on the member adapted to serve as a rudder for the machine, the whole constituting a unit structure balanced and supported solely on the axis of said wheels.

11. In a self-propelled agricultural machine, the combination of a frame, a pair of tractor wheels, means for vertically adjusting a wheel, a motor mounted on the frame, gearing connections between said motor and the tractor wheels respectively to propel the machine and operable to exert a reactionary force on said wheels to raise the frame relatively thereto, and an implement carrying member mounted on the frame, the whole constituting a unitary structure balanced and supported solely on the axis of the tractor wheels.

12. In a self-propelled agricultural machine, the combination of a frame, a pair of tractor wheels mounted to have independent vertical adjustment on the frame, a motor mounted on the frame, gearing connections between said motor and the tractor wheels respectively to propel the machine and operable to exert a reactionary force on said wheels to raise the frame relatively thereto, and an implement carrying member mounted to have lateral adjustment on the frame, the whole constituting a unitary structure supported and balanced solely on the axis of the tractor wheels.

13. In a self-propelled agricultural machine, the combination of a frame, a pair of tractor wheels, means for vertically adjusting a wheel on the frame, a motor mounted on the frame, gearing connections between said motor and the tractor wheels respectively to propel the machine and operable to exert a reactionary force on said wheels to raise the frame relatively thereto, an implement carrying member mounted to have lateral adjustment relatively to the frame, and an implement mounted on said beam providing a rudder for the machine during the travel thereof, the whole constituting a unitary structure balanced and supported solely on the axis of the tractor wheels.

14. In a self-propelled agricultural machine the combination of a frame, a pair of tractor wheels supporting said frame, means for vertically adjusting a wheel, a motor mounted on the frame and connected to drive the wheels, a tool carrying member pivotally mounted on the frame and adapted to have lateral angular adjustment thereon, an implement carried by said member providing a rudder for the machine during the travel thereof, the whole constituting a unitary structure balanced and supported solely on the axis of said wheels.

15. In a self-propelled agricultural machine the combination of a frame, a pair of tractor wheels supporting said frame and mounted to have independent vertical adjustment thereon, a motor mounted on the frame and connected to drive the wheels, a tool carrying member having an adjustable pivotal connection with the frame and adapted to have lateral angular adjustment thereon, means for securing said member in adjusted position, and an implement mounted on said member providing a rudder for the machine during the travel thereof, the whole constituting a unitary structure supported and balanced solely on the axis of the tractor wheels.

16. In a self-propelled agricultural machine the combination of a frame, a pair of tractor wheels supporting the said frame, and means for vertically adjusting a wheel, a motor mounted on the frame, gearing connections between said motor and tractor wheels respectively to propel the machine and operable to exert a reactionary force on said wheels to raise the frame relatively thereto, manually operated means for determining the extent of adjustment of said wheels, an implement carrying member mounted to have lateral adjustment on the frame, and an implement mounted on said member providing a rudder for the machine during the travel thereof, the whole constituting a unitary structure balanced and supported solely on the axis of the tractor wheels.

17. In a self-propelled agricultural machine the combination of a frame, a pair of tractor wheels mounted to have independent vertical adjustment on the frame, a motor mounted on the frame, gearing connections between said motor and the tractor wheels respectively to propel the machine and operable to exert a reactionary force on said wheels to raise the frame relatively thereto, an implement carrying member swiveled to have lateral adjustment on the frame, means for securing said member in adjusted position, and an implement mounted on said member providing a rudder for the machine during the travel thereof; the whole constituting a unitary structure balanced and supported solely on the axis of the tractor wheels.

18. In a self-propelled agricultural machine the combination of a frame, a pair of tractor wheels mounted to have independent vertical adjustment on the frame, a motor mounted on the frame, gearing connections between said motor and the tractor wheels respectively to propel the machine and operable to exert a reactionary force on said wheels to raise the frame relatively thereto, manually controlled means for determining the extent of said wheel adjustment, means for holding the frame in adjusted position, an implement carrying member mounted on the frame, and an implement mounted on said member providing a rudder for the machine during the travel thereof, the whole constituting a unitary structure balanced and supported solely on the axis of the tractor wheels.

19. In a self-propelled agricultural machine, the combination of a frame, a pair of tractor wheels mounted to have independent vertical adjustment on the frame, a motor mounted on the frame, gearing connections between said motor and the tractor wheels respectively to propel the machine, said gearing operable to exert reactionary force on said wheels independently to raise the respective sides of said frame and permit the same to lower by gravity, an implement carrying member mounted on the frame, and an implement mounted on said member providing a rudder for the machine during the travel thereof, the whole constituting a unitary structure balanced and supported solely on the axis of the tractor wheels.

20. In a self-propelled agricultural machine the combination of a frame, a pair of tractor wheels supporting the frame, a motor mounted on the frame and connected to drive said tractor wheels and having independent gearing connections with the tractor wheels respectively and operable through reactionary force to effect separate adjustments thereof, an implement carrying member mounted on the frame, an implement mounted on said member and providing a rudder for the machine during the travel thereof, manually operated means for controlling the respective wheel drives to effect adjustment of said wheels and obtain relative speeds thereof for turning the machine; the whole constituting a unitary structure balanced and supported solely on the axis of the tractor wheels.

21. In a self-propelled agricultural machine the combination of a frame, tractor wheels supporting the frame and having independent vertical adjustment thereon, a motor mounted on the frame and having driving connections with said wheels respectively, said frame provided with a plurality of laterally disposed apertures, a laterally adjustable implement carrying member having a selective pivotal engagement with said apertures, means for securing said member in adjusted position; and an implement mounted on said member providing a rudder for the machine during the travel thereof, the whole constituting a unitary structure balanced and supported solely on the axis of the tractor wheels.

In witness whereof I have signed this specification in the presence of two witnesses.

ALBERT WYLES, Junior.

Witnesses:
H. J. SWINDLER,
ALBT. WYLES, SR.